United States Patent Office 3,326,987
Patented June 20, 1967

3,326,987
CHLORINATION OF AROMATIC HYDROCARBON
Bradshaw F. Armendt, Bruce R. Coltharp, and Harold W. Earhart, Baytown, Tex., assignors, by mesne assignments, to Esso Research and Engineering Company, Elizabeth, N.J., a corporation of Delaware
No Drawing. Filed July 30, 1964, Ser. No. 386,417
2 Claims. (Cl. 260—650)

The present invention is directed to the chlorination of a methyl-substituted aromatic hydrocarbon. More particularly, the present invention is directed to the nuclear chlorination of a methyl-substituted aromatic hydrocarbon by contacting the hydrocarbon with an admixture of nitric and hydrochloric acids at elevated temperatures.

The present invention is directed to the production of nuclear chlorinated methyl-substituted hydrocarbons. The prior art method of chlorination by the use of free chlorine gas has many drawbacks, not the least of which is the extremely corrosive nature of the free chlorine gas and the attendant dangers to operators due to the toxic nature of the gas should it escape. Further, when using free chlorine gas, under certain conditions the hydrogen in the methyl group will react with the gas rather than the hydrogen on the benzene nucleus, so that a chloromethylated product will be obtained rather than the nuclearly substituted product.

The present invention may be shown schematically by the following reaction:

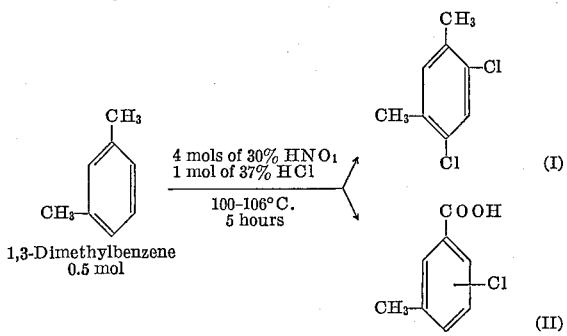

By reference to the above exemplary equation, it is seen that 1,3-dimethylbenzene (m-xylene) can be converted into (I), 1,3-dimethyl-4,6-dichlorobenzene. The selectivity is about 73%. Also formed in minor quantities is (II), 3-methylchlorobenzoic acid.

The nuclearly chlorinated compounds such as 1,3-dimethyl-4,6-dichlorobenzene can be used as starting materials in the production of many chemicals, such as cresols and hydroxy benzoic acids.

In general, the present invention is directed to methyl-substituted aromatic hydrocarbons, generally having from 1 to 3 aromatic nuclei. Exemplary compounds are toluene, xylenes, mesitylene, pseudocumene, hemimellitene, etc., the methyl-substituted naphthalene series, and the methyl-substituted anthracenes. The preferred feedstock is metaxylene (1,3 - dimethylbenzene). At least two nuclear carbons must be unsubstituted to allow chlorination.

The acid is made up of nitric and hydrochloric acids in admixture, and (based upon one molar part of methyl-substituted aromatic hydrocarbon) from 2 to 8 mols of 25 to 40 weight percent $HNO_3$ are employed along with 0.5 to 2 mols of 30 to 37 weight percent aqueous HCl. Preferably, 8 mols of 30% $HNO_3$ and 2 mols of 37 weight percent aqueous HCl are employed.

The temperature of reaction can vary from 70° C. to 130° C., preferably 100° C. to 106° C. The pressure is not critical and may be subatmospheric, atmospheric or superatmospheric, as desired, so long as the reaction is maintained in the liquid phase. Generally, from 15 to 50 p.s.i.g. will be employed, although atmospheric pressure, for ease of operation and economy of equipment design, is preferred.

The reaction time may vary from 2 to 8 hours, depending upon the concentrations used and upon the temperature and pressure employed. At atmospheric pressure and 100° C., when using the preferred 8 mols of 30% aqueous $HNO_3$ and 2 mols of 37 weight percent HCl per mol of metaxylene, the reaction time should be about 5 hours.

Example

In order to illustrate a preferred mode of carrying out the present invention, the following run was made. Metaxylene (0.5 mol) was admixed with 4 mols of 30% $HNO_3$ and 1 mol of 37% HCl, and maintained at a temperature of 100° C. to 106° C. for 5 hours in a stirred flask equipped with a reflux condenser. Atmospheric pressure was employed, and the reaction mass was agitated continuously during the 5-hour reaction time.

At the end of 5 hours, heat was removed, and the products cooled and separated into a hydrocarbon layer and an acid layer. The hydrocarbon layer was decanted, water washed, neutralized with sodium carbonate, and distilled to obtain 63.7 g. (0.364 mol) of 1,3-dimethyl-4,6-dichlorobenzene and 5.1 g. (0.03 mol) of a nuclearly chlorinated toluic acid. Selectivity to the 1,3-dimethyl-4,6-dichlorobenzene was about 82.5%. The yield was 72.8%, based on 1,3-dimethylbenzene charged.

Having disclosed the essence of the present invention, and a preferred mode of carrying out the process of the present invention, what is desired to be covered by Letters Patent should be limited not by the hereinabove set forth disclosure, but rather by the appended claims.

We claim:
1. A method of chlorinating the nucleus of 1,3-dimethylbenzene, which comprises contacting one molar part of said 1,3-dimethylbenzene at a temperature of 70° C. to 130° C. and a pressure of atmospheric to 50 p.s.i.g., with 2 to 8 molar parts of 25 to 40 weight percent concentration aqueous $HNO_3$ and 0.5 to 2 molar parts of 30 to 37 weight percent concentration aqueous HCl for a reaction period of 2 to 8 hours.

2. A method of chlorinating the nucleus of 1,3-dimethylbenzene which comprises contacting one molar part of 1,3-dimethylbenzene at a temperature of 100° C. to 106° C. and atmospheric pressure with 8 molar parts of 30 weight percent aqueous $HNO_3$ and 2 molar parts of 37 weight percent aqueous HCl for a reaction time of about 5 hours, to obtain 1,3-dimethyl-4,6-dichlorobenzene as a product.

References Cited

UNITED STATES PATENTS 3,160,653   12/1964   Benning et al. ____ 260—650 X

LEON ZITVER, Primary Examiner.

K. V. ROCKEY, H. T. MARS, Assistant Examiners.